United States Patent [19]

Takada

[11] Patent Number: 5,629,378
[45] Date of Patent: May 13, 1997

[54] SUSPENDING AGENT FOR SUSPENSION POLYMERIZATION OF VINYL COMPOUND

[75] Inventor: Shigeki Takada, Kurashiki, Japan

[73] Assignee: Kuraray Co., Ltd., Kurashiki, Japan

[21] Appl. No.: 529,064

[22] Filed: Sep. 15, 1995

[30] Foreign Application Priority Data

Oct. 7, 1994 [JP] Japan ................... 6-243782

[51] Int. Cl.$^6$ .................................................. C08G 63/48
[52] U.S. Cl. .................................. 525/57; 525/61
[58] Field of Search .............................. 524/459; 525/56, 525/61, 330.4, 57; 526/222, 224, 319

[56] References Cited

U.S. PATENT DOCUMENTS

| | | | |
|---|---|---|---|
| 4,565,854 | 1/1986 | Sato et al. | 526/214 |
| 4,931,518 | 6/1990 | Sharaby | 526/224 X |
| 5,308,911 | 5/1994 | Takada et al. | 524/503 |
| 5,349,008 | 9/1994 | Takada et al. | 524/557 |
| 5,360,860 | 11/1994 | Itoh et al. | 524/459 X |

FOREIGN PATENT DOCUMENTS

| | | |
|---|---|---|
| 52-110797 | 9/1977 | Japan . |
| 59-187003 | 10/1984 | Japan . |
| 1-95103 | 4/1989 | Japan . |
| 6-145208 | 5/1994 | Japan . |
| 91/15518 | 10/1991 | WIPO . |

OTHER PUBLICATIONS

The Poval Book. Polymer Press, 1984.
Polyvinyl Alcohol–Development. C.A. Finch, Wiley, 1992.

*Primary Examiner*—Judy M. Reddick
*Attorney, Agent, or Firm*—Oblon, Spivak, McClelland, Maier & Neustadt, P.C.

[57] ABSTRACT

The present invention is to provide a suspending agent for suspension polymerization of a vinyl compound which comprises a polyvinyl alcohol polymer (A) having a degree of hydrolysis of at least 60 mol % and a mercapto group at an end thereof; and furthermore a suspending agent for suspension polymerization of a vinyl compound which comprises a polyvinyl alcohol polymer (A) having a degree of hydrolysis of at least 60 mol % and a mercapto group at an end thereof and a polyvinyl ester polymer (B) having a degree of hydrosis of less than 60 mol %, weight ratio of component (A)/component (B) being 40/60 to 95/5.

The suspending agent for suspension polymerization of a vinyl compound of the present invention has an excellent less-foaming effect and an effect of giving uniform and porous vinyl polymer granules.

1 Claim, No Drawings

SUSPENDING AGENT FOR SUSPENSION POLYMERIZATION OF VINYL COMPOUND

BACKGROUND OF THE INVENTION

1. Field of the Invention

The present invention relates to a suspending agent for suspension polymerization of a vinyl compound. More specifically, the present invention pertains to a suspending agent having an excellent less-deforming effect for suspension polymerization of a vinyl compound such as vinyl chloride.

2. Description of the Prior Art

In industrially producing a vinyl polymer such as a vinyl chloride resin, there has heretofore been widely practiced a suspension polymerization in which a vinyl compound such as vinyl chloride is suspended in an aqueous medium in the presence of a suspending agent and polymerized by the use of an oil-soluble catalyst.

In general, the factors regulating the quality of a vinyl polymer include conversion to polymer, water-monomer ratio, polymerization temperature, kind and amount of catalyst, type of polymerization vessel, agitation rate, kind and amount of suspending agent and the like. Among them, the kind of suspending agent has a large effect.

The performances of a suspending agent required for suspension polymerization of a vinyl compound are (1) a function of making the granulometric distribution of vinyl polymer granules obtained as sharp as possible; (2) a function of making each polymer granule porous in order to increase the absorption rate of a plasticizer for facilitating the workability, to facilitate the removal of monomers such as vinyl chloride residue in polymer granules and to prevent the formation of fish eye, etc. in the molding; and (3) a function of preparing polymer granules with a larger bulk density, and the like.

As a suspending agent for suspension polymerization of a vinyl compound, there has heretofore been used a cellulose derivative such as methyl cellulose or carboxymethyl cellulose or a partially hydrolyzed polyvinyl alcohol or the like, alone or in combination. However, the conventional suspending agents have a problem of no satisfying the required performances (1) to (3) described above.

The suspension polymerization of a vinyl compound such as vinyl chloride is generally carried out by batch production, where it is generally carried out by the method of charging an aqueous medium, a suspending agent, a polymerization initiator, a vinyl compound and the like in a polymerization vessel, further adding a necessary additive therein, and thereafter raising the temperature for polymerization.

Recently, it has been required to shorten the time period of one batch for polymerization in order to improve the productivity. In the suspension polymerization of a vinyl compound, therefore, the efficiency of removing the heat of polymerization has been improved by equipping a reflux condenser and the like; and a method of charging a preliminarily heated aqueous medium (hot-charge method) has been adopted for shortening the time period for the elevation of the temperature.

However, the conventional suspending agents for suspension polymerization of a vinyl compound has caused the the decrease of the productivity due to the decrease in the effective volume of a polymerization vessel and impossible temperature control in the case of the use of a polymerization vessel equipped with a reflux condenser because the conventional suspending agents give severe foaming during the polymerization; and the serious disadvantage of the decrease of the porosity of the vinyl polymer granules when the hot-charge method is used.

Alternatively, in order to prevent foaming, the addition of a deforming agent and the like decreases the thermal stability of the vinyl polymer granules, disadvantageously.

The Poval Book (issued by Polymer Press, 1984) (prior art (a)) describes, as a suspending agent for suspension polymerization of vinyl chloride, a polyvinyl alcohol having a degree of polymerization of 2,000 and a degree of hydrolysis of 80 mol %; and a polyvinyl alcohol having a degree of polymerization of 700 to 800 and a degree of hydrolysis of 70 mol %, respectively. WO 91/15518 (prior art (b)) describes a suspending agent for suspension polymerization of a vinyl compound comprising a polyvinyl alcohol having a degree of polymerization of at least 100, a degree of hydrolysis of 50 to 90 mol % and an amino group, an ammonium group, a carboxyl group or a sulfonic acid group at an end thereof. However, the suspending agents described in the prior arts (a) and (b) have a drawback to cause severe foaming during the polymerization.

Japanese Patent Application Laid-open No. 110797/1977 (prior art (c)) describes a secondary suspending agent for suspension polymerization of vinyl chloride comprising a polyvinyl acetate having a degree of hydrolysis of 30 to 60 mol %. Japanese Patent Application Laid-open No. 145208/1994 (prior art (d)) describes a secondary suspending agent for suspension polymerization of a vinyl compound comprising a water-insoluble polymer having a mercapto group at an end thereof and, as said water-insoluble polymer, exemplified by a polyvinyl ester polymer having a degree of hydrolysis of 50 mol % or less and a mercapto group at an end thereof. However, the secondary suspending agents described in the prior arts (c) and (d) cannot give a stable suspension polymerization of a vinyl compound, when said secondary suspending agents are used alone. Whereas the severe foaming is caused in the polymerization vessels when said secondary suspending agents are used in combination with the conventional partially hydrolyzed polyvinyl alcohol.

Polyvinyl Alcohol-Development (C. A. Finch, Wiley, 1992) (prior art (e)) describes an emulsion polymerization of methacrylate ester or styrene by the use of a polyvinyl alcohol having a degree of polymerization of 1,500, a degree of hydrolysis of 88 mol % and a mercapto group at an end thereof. However, the emulsion polymerization has a problem of being difficult to obtain powdered polymer being suitable for melt molding from the aqueous emulsion because a water-soluble initiator is used and the polymer obtained is in the form of an aqueous emulsion with a particle size of about 0.1 to 2 μm in an emulsion polymerization described in the prior art (e).

It is an object of the present invention to provide a suspending agent having an excellent less-forming effect in a polymerization vessel and concurrently to satisfy the required performances (1) to (3) described above even in the case of a method of the use of a polymerization vessel equipped with a condenser, the hot-charge method and the hot-charge method with the use of a polymerization vessel equipped with a condenser, as well as in the case of the conventional general method for suspension polymerization of a vinyl compound of charging an aqueous medium at room temperature (cold-charge method) and the method of controlling the polymerization temperature by a jacket or a coil equipped to a polymerization vessel.

SUMMARY OF THE INVENTION

The present inventor has studied intensively in order to overcome the above problems and, consequently, the inventor has found a suspending agent for suspension polymerization of a vinyl compound which comprises a polyvinyl alcohol polymer (A) having a degree of hydrolysis of at least 60 mol % and a mercapto group at an end thereof (first invention); and a suspending agent for suspension polymerization of a vinyl compound which comprises said polyvinyl alcohol polymer (A) and a polyvinyl ester polymer (B) having a degree of hydrolysis of less than 60 mol %, weight ratio of the component (A)/the component(B) being 40/60 to 95/5 (second invention). Thus, the present invention has been completed.

BRIEF DESCRIPTION OF THE PREFERRED EMBODIMENT

First of all, the first invention is described.

The polyvinyl alcohol polymer (A) of the present invention is a polyvinyl alcohol polymer having a degree of hydrolysis of at least 60 mol % and a mercapto group at an end thereof (preferably at one end thereof). The degree of hydrolysis of the polyvinyl alcohol polymer (A) is at least 60 mol %, preferably 65 to 95 mol %, and most preferably 68 to 80 mol %. The viscosity average degree of polymerization (hereinafter abbreviated as "degree of polymerization") of the polyvinyl alcohol polymer (A) is not specifically limited, but preferably 200 to 3,500, more preferably 600 to 1,500 and most preferably 680 to 1,000.

The polyvinyl alcohol polymer (A) of the present invention can be increased in water solubility by introducing an ionic group into the polymer and, in that case, said degree of hydrolysis can be calculated only from the amounts of the vinyl ester group and the vinyl alcohol group, where the degree of hydrolysis of ionic groups introduced is not included to said degree of hydrolysis.

The polyvinyl alcohol polymer (A) of the present invention can give a stable suspension polymerization of a vinyl compound even when the polymer (A) is used alone, and the polymer (A) is preferably soluble in water at 5° to 100° C. (preferably at 10° to 90° C.).

The method of producing the polyvinyl alcohol polymer (A) of the present invention is not specifically limited, but simple and efficient is a method of subjecting vinyl ester monomer to radical polymerization in the presence of thiolie carboxylic acid or a compound having thioester and a thiol group in the molecule thereof like 2-acetylthioethyl thiol, 10-acetylthiodecane thiol, treating the obtained vinyl ester polymer by an alkali such as sodium hydroxide or ammonia to hydrolyze the vinyl ester polymer and to simultaneously hydrolyze the thioester of an end thereof, and thereby producing a polymer having a thiol group at an end thereof.

Such vinyl ester includes, for example, vinyl formate, vinyl acetate, vinyl propionate, vinyl lactate, vinyl isolactate, vinyl pivalate, vinyl versatate, vinyl caproate, vinyl caprylate, vinyl laurate, vinyl palmitate, vinyl stearate, vinyl oleate and the like.

The polyvinyl alcohol polymer of the present invention can be modified by 10 mol % or less of an ionic group such as ammonium group, carboxyl group, sulfonic acid group and the like, a nonionic group or a (long-chain) alkyl group.

The method of producing the polyvinyl alcohol polymer (A) is described in detail in Japanese Patent Application No. 61746/1983 (Japanese Patent Application Laid-open No. 187003/1984).

Next, the second invention of the present invention is described.

The polyvinyl alcohol polymer (A) to be used in the second invention is the same as the polyvinyl alcohol polymer (A) to be used in the first invention.

The degree of hydrolysis of the polyvinyl ester polymer (B) of the second invention has a degree of hydrolysis of less than 60 mol %, preferably 20 to 55 mol % and more preferably 25 to 45 mol %. The weight ratio of the component (A)/component (B) is 40/60 to 95/5, preferably 50/50 to 90/10, and more preferably 60/40 to 80/20.

In the case where the weight ratio of the component (A)/component (B) is more than 95/5, the effect of improving the porosity cannot be observed sometimes; in the case where the ratio is less than 40/60, the polymerization stability can be lost sometimes.

The degree of polymerization of the polyvinyl ester polymer (B) of the present invention is not specifically limited, but preferably 1,000 or less, more preferably 200 to 550, and most preferably 230 to 400.

The polyvinyl ester polymer (B) of the present invention is water-insoluble or water dispersible. By introducing an ionic group and the like into the polymer, the polymer can be self-emulsifiable.

In the present invention the suspending agent of the first invention in combination with the polyvinyl ester polymer (B) as a secondary suspending agent is referred to as a suspending agent.

The method of producing the polyvinyl ester polymer (B) of the present invention is not specifically limited, and also the conventionally known polymers can be used. There can be preferably used the polyvinyl ester polymer having am ionic group at the side-chain thereof which is described in Japanese Patent Application Laid-open No. 95103/1989, the polyvinyl ester polymer having an ionic group at an end thereof which is described in WO 91/15518 and the known polyvinyl ester polymer having 10 mol % or less of a nonionic group or a (long-chain) alkyl group.

Next, a method of producing a vinyl polymer by suspension polymerization of a vinyl compound using the suspending agent of the present invention is described.

The temperature of an aqueous medium to be used in the method of producing a vinyl polymer is not specifically limited, and also hot water above 90° C. as well as cold water at about 20° C. can be used preferably.

The medium for the heated aqueous medium is exemplified by an aqueous solution containing various additive components or an aqueous medium containing an organic solvent, in addition to pure water. In the amount of the heated aqueous medium to be charged into a polymerization system can be an amount enough to raise the temperature of the polymerization system to a necessary level.

And, a polymerization vessel equipped with a reflux condenser can be preferably used in order to improve efficiency of removing the heat of polymerization.

The amount of the suspending agent to be used in the method of producing a vinyl polymer is not specifically limited but, generally, the amount is less than 5 parts by weight, preferably 0.01 to 1 part by weight, and more preferably 0.02 to 0.2 parts by weight on the basis of 100 parts by weight of a vinyl compound. The suspending agent of the present invention can be used alone or in combination with polyvinyl alcohol; a water-soluble cellulose ether such as methyl cellulose, hydroxyethyl cellulose, hydroxypropyl cellulose and hydroxypropylmethyl cellulose; a water-soluble polymer such as gelatin; an oil-soluble emulsifier such as sorbitan monolaurate, sorbitan trioleate, glycerin tristearate and ethyleneoxide-propyleneoxide block copolymer; and an aqueous emulsifier such as polyoxyethylene sorbitan monolaurate, polyoxyethylene glycerin oleate and sodium laurate, which are generally used for the suspension polymerization of a vinyl compound such as vinyl chloride in an aqueous medium. The amount of the components described above is not specifically limited, but preferably 0.01 to 1.0 part by weight on the basis of 100 parts by weight of a vinyl compound such as vinyl chloride.

Other various additives can be added, if necessary. The various additives are exemplified by a polymerization regulator such as acetaldehyde, butyl aldehyde, trichloroethylene, perchloroethylene or a mercaptan, a polymerization inhibitor such as a phenol compound, a sulfur compound, a N-oxide compound and the like. Furthermore, a pH adjuster, a scale preventing agent, a cross-linking agent, etc. can be added. And plurality of the afore mentioned additives can be used in combination.

Next, a conventional polymerization initiator for the polymerization of a vinyl compound such as vinyl chloride can be used and exemeplified by a percarbonate compound such as di-isopropyl peroxydicarbonate, di-2-ethylhexyl peroxydicarbonate and diethoxyethyl peroxydicarbonate; a perester compound such as t-butyl peroxyneodecanate, α-cumyl peroxyneodecanate and t-butyl peroxyneodecanate; a peroxide such as acetylcyclohexylsulfonyl peroxide and 2,4,4-trimethylpentyl-2-peroxyphenoxyacetate; an azo compound such as 2,2-azobisisobutyronitrile, azobis-2,4-dimethylvaleronitrile and azobis(4-methoxy-2,4-dimethylvaleronitrile. These initiators can be used in combination with potassium persulfate, ammonium persulfate, hydrogen peroxide and the like.

A vinyl compound to be used for the suspension polymerization using the suspending agent of the present invention is exemplified by vinyl chloride alone or a monomer-mixture containinig mainly vinyl chloride (at least 50% by weight of vinyl chloride), and the comonomer to be copolymerized with vinyl chloride includes a vinyl ester such as vinyl acetate and vinyl propionate; a (meth)acrylate ester such as methyl (meth)acrylate and ethyl (meth)acrylate; an olefin such as ethylene and propylene; maleic anhydride, acrylonitrile, itaconic acid, styrene, vinylidene chloride, vinyl ether and, additionally, a monomer copolymerizable with vinyl chloride. Furthermore, the suspending agent of the present invention can be used for the polymerization and copolymerization of the aforementioned vinyl compounds without using vinyl chloride.

In the suspension polymerization using the suspending agent of the present invention, the ratio of each component to be charged, the polymerization temperature and the like can be determined according to the conventional conditions employed for the suspension polymerization of a vinyl compound such as vinyl chloride.

Additionally, the charging order and the ratio of a vinyl compound, a polymerization initiator, a suspending agent, a heated aqueous medium and other additives are not specifically limited.

A method of preliminarily heating a vinyl compound prior to charging the compound into a polymerization vessel, simultaneously with the use of a heated water, can be preferably used.

The suspending agent of the present invention can increase the effective volume of a polymerization vessel to improve the productivity and can readily control the temperature of a polymerization vessel during the polymerization even in the case of the suspension polymerization using a polymerization vessel equipped with a reflux condenser, the suspension polymerization by the hot-charge method, or the suspension polymerization by -the hot-charge method using a polymerization vessel equipped with a reflux condenser, because the suspending agent of the present invention has an excellent less-foaming effect during the polymerization, compared with the conventional suspending agents.

When the suspending agent for suspension polymerization of the the present invention is used, the vinyl polymer granules obtained have a large granule size with a sharp distribution thereof and less-scattering during handling, and additionally with excellent striking-through into molding machines and the like, and furthermore the vinyl polymer granules having a large porosity, a high absorption rate of a plasticizer and a high bulk density are obtained. Therefore, the suspending agent for suspension polymerization of the present invention has an excellent industrial value.

The present invention is described, in details, in the following examples, but the present invention is not limited to these examples. Herein, "%" and "part (parts)" in the following examples mean "% by weight" and "part (parts) by weight", respectively, unless specifically remarked.

PRODUCTION EXAMPLE

[Polyvinyl alcohol polymer having a mercapto group at an end thereof]

2800 parts of vinyl acetate (hereinafter abbreviated as "VAc") and 670 parts of methanol were charged into a reaction vessel and the inner part of the reaction vessel was sufficiently replaced with nitrogen. At the time when the inner temperature of the reaction vessel reached 60° C. by raising the temperature of the outer face of the reaction vessel to 65° C., 10 parts of methanol combining 0.243 part of thioacetic acid which were preliminarily replaced with nitrogen were added into the reaction vessel and followed by addition of 20 parts of methanol solution containing 1 part of 2,2'-azobisisobutyronitrile. Immediately thereafter, 18 parts of a methanol solution containing 1.8 parts of thioacetic acid were added for 4 hours. The conversion to polymer after 5 hours was 64.7%.

After 5 hours, the vessel was cooled and the residual VAc along with methanol was removed out of the system under reduced pressure, while further adding methanol, to give a methanol solution of polyvinyl ester (hereinafter abbreviated as "PVAc") having a concentration of 62%. A part of the above methanol solution was separated and was adjusted to a concentration of 30% of PVAc. A solution of NAOH in methanol was added to the adjusted solution of PVAc so that a water content of 3% and a ratio of [NaOH]/[VAc] of 0.02 (molar ratio) and was hydrolyzed at 40° C. for 1 hour. Then, the hydrolysis reaction was terminated by adding an acetic acid to neutralize the residual NaOH. The degree of hydrolysis measured was 72 mol %.

By the same method described above, hydrolysis of the above PVAc was carried out at a ratio of [NaOH]/[VAc] of 0.05 (molar ratio) to give polyvinyl alcohol (PVA), which was then purified by Soxlet extraction by using methanol. Thereafter, the degree of hydrolysis measured was 98.9 mol %. Additionally, the intrinsic viscosity was measured in water at 30° C., and to give a degree of polymerization of 820.

The content of a mercapto group (hereinafter abbreviated as "SH group") contained in the PVA was determined by a method of iodine oxidation, by using the above purified PVA. The content of $4.0 \times 10_5$ equivalent of SH group on the basis of 1 g-PVA was confirmed.

The above purified PVA was reacetylated by the usual method to give a reacetylated PVAc and GPC measurement of the reacetylated PVAc was conducted in THF at 40° C. by using polystyrene as a standard to yield Pw/Pn=2.1.

Polyvinyl alcohol polymers (A) of the suspending agent of the present invention obtained by the same method are shown on Table 1. All of these suspending agents were soluble in water or warm water.

[POLYMERIZATION OF VINYL CHLORIDE]

In a glass-lining autoclave equipped with a reflux condenser were fed 1 part of deionized water dissolving a suspending agent shown on the Table (Examples 1 to 10 are shown on Table 1; Examples 11 to 21 are shown on Table 2; Comparative Examples 1 to 7 are shown on Table 3. Subsequently, 0.04 part of a 70% solution of di-isopropyl peroxydicarbonate in toluene was fed in the autoclave, which was then evacuated to a reduced pressure of 50 mm Hg, to expel oxygen. Thereafter, 39 parts of hot water at 80° C. and 30 parts of vinyl chloride monomer were fed into the autoclave under agitation. The liquid level was at the height of 60% of the polymerization vessel from the bottom when feeding was completed and the temperature of the inner part was 50° C. The temperature of the inner part was kept at 50° C. and polymerization was continued. The pressure in the autoclave of 7.0 kg/cm² G at the beginning of the polymerization fell down to 4.0 kg/cm² G after 6 hours from the beginning of the polymerization, and the polymerization was stopped. Then, unreacted vinyl chloride monomer was removed, and the content was taken out of the autoclave, followed by dehydration and drying.

The properties of the vinyl chloride resin obtained were assessed by the following methods, and the results of the assessment are shown on the Tables. The the vinyl chloride polymer had a polymerization yield of 85% and an average degree of polymerization of 1,300.

(1) Plasticizer absorption 400 g of vinyl chloride polymer granules was fed into a planetary mixer connected to a plastograph, and the polymer granules were preheated to 88° C. under agitation at 60 rpm for 4 minutes. And then 200 g of dioctyl phthalate was fed. The plasticizer adsorption was expressed by the kneading period of time (minute) until the kneading torque went down.

(2) CPA (Cold Plasticizer Absorption)

The absorption of dioctyl phthalate was measured at 23° C., according to the method described in ASTM-D3367-75.

(3) Assessment of Foaming

After the polymerization was over, the foaming state inside the polymerization vessel was observed with the naked eye. The results are shown by the following symbols:

⊚: No foaming

○: Foaming was observed up to 62 to 65% of the height of the polymerization vessel from the bottom.

△: Foaming was observed up to 66 to 70% of the height of the polymerization vessel from the bottom.

▲: Foaming was observed up to 90 to 100% of the height of the polymerization vessel from the bottom.

x: Foaming was observed up to 100% of the height of the polymerization vessel from the bottom and further the reflux condenser was filled with a lot of foam.

TABLE 1

| Examples | Suspending agent | | | | | | | Result of assessment of performance | | | |
|---|---|---|---|---|---|---|---|---|---|---|---|
| | Polyvinyl alcohol polymer (A) | | | Polyvinyl ester polymer (B) | | | Amount to | Polymerization stability | CPA (%) | Plasticizer absorption time (min) | Foaming state |
| | DP[1] | DH[2] (mol %) | Modified group | DP[1] | DH[2] (mol %) | Modified group | (A)/(B) | be used (%/monomer) | | | |
| 1 | 380 | 68 | SH group[3] | | | | 100/0 | 0.1 | excellent | 29 | 3.0 | △ |
| 2 | 620 | 62 | SH group[3] 0.3 mol % of IA[4] | | | | " | " | " | 30 | 2.8 | △ |
| 3 | 670 | 62 | SH group[3] 0.3 mol % of IA[4] | | | | " | " | " | 31 | 2.7 | △ |
| 4 | 690 | 63 | SH group[3] 0.3 mol % of IA[4] | | | | " | " | " | 32 | 2.6 | △ |
| 5 | 820 | 63 | SH group[3] 0.3 mol % of IA[4] | | | | " | " | " | 33 | 2.4 | ○ |
| 6 | 820 | 70 | SH group[3] | | | | " | " | " | 35 | 2.1 | ⊚ |
| 7 | 820 | 78 | " | | | | " | " | " | 35 | 2.1 | ⊚ |
| 8 | 820 | 82 | " | | | | " | " | " | 34 | 2.3 | ⊚ |
| 9 | 820 | 88 | " | | | | " | " | " | 32 | 2.5 | △ |
| 10 | 820 | 94 | " | | | | " | " | " | 30 | 2.8 | △ |

[1]DP: degree of polymerization
[2]DH: degree of hydrolysis
[3]SH group: mercapto group at one end of polymer
[4]IA: itaconic acid at side-chain

TABLE 2

| Examples | Suspending agent | | | | | | | Result of assessment of performance | | | |
|---|---|---|---|---|---|---|---|---|---|---|---|
| | Polyvinyl alcohol polymer (A) | | | Polyvinyl ester polymer (B) | | | Amount to | Polymerization stability | CPA (%) | Plasticizer absorption time (min) | Foaming state |
| | DP[1] | DH[2] (mol %) | Modified group | DP[1] | DH[2] (mol %) | Modified group | (A)/(B) | be used (%/monomer) | | | |
| 11 | 820 | 72 | SH group[3] | 180 | 15 | unmodified | 70/30 | 0.12 | excellent | 36 | 1.8 | ○ |
| 12 | 820 | 72 | " | 220 | 22 | 0.3 mol % | " | " | " | 38 | 1.7 | ○ |

TABLE 2-continued

| Ex-am-ples | Suspending agent ||||||| Amount to be used (%/monomer) | Result of assessment of performance ||||
|---|---|---|---|---|---|---|---|---|---|---|---|---|
| | Polyvinyl alcohol polymer (A) ||| Polyvinyl ester polymer (B) ||| (A)/(B) | | Polymer-ization stability | CPA (%) | Plasticizer absorption time (min) | Foam-ing state |
| | DP[1] | DH[2] (mol %) | Modified group | DP[1] | DH[2] (mol %) | Modified group | | | | | | |
| 13 | 820 | 72 | " | 250 | 27 | CA group[5] | " | " | " | 39 | 1.6 | ◉ |
| 14 | 820 | 72 | " | 380 | 42 | " | " | " | " | 40 | 1.5 | ◉ |
| 15 | 820 | 72 | " | 420 | 47 | SH group[3] | " | " | " | 41 | 1.4 | ◉ |
| 16 | 820 | 72 | " | 540 | 54 | unmodified | " | " | " | 38 | 1.6 | ◉ |
| 17 | 980 | 72 | " | 580 | 58 | " | " | " | " | 36 | 1.8 | ○ |
| 18 | 1050 | 70 | " | 580 | 58 | " | 60/40 | 0.15 | " | 35 | 2.0 | ○ |
| 19 | 1400 | 72 | SH group[3] 0.2 mol % of IA[4] | 580 | 58 | " | 45/55 | " | " | 32 | 2.4 | ○ |
| 20 | 2230 | 75 | SH group[3] 0.2 mol % of IA[4] | 980 | 55 | " | " | " | " | 30 | 2.7 | △ |
| 21 | 2800 | 80 | SH group[3] | 580 | 58 | 0.3 mol % of IA[4] | " | " | " | 30 | 2.8 | △ |

[1]DP: degree of polymerization
[2]DH: degree of hydrolysis
[3]SH group: mercapto group at one end of polymer
[4]IA: itaconic acid at side-chain
[5]CA group: carboxyl group at one end of polymer

TABLE 3

| Com-para-tive Ex-am-ples | Suspending agent ||||||| Amount to be used (%/monomer) | Result of assessment of performance ||||
|---|---|---|---|---|---|---|---|---|---|---|---|---|
| | Polyvinyl alcohol polymer (A) ||| Polyvinyl ester polymer (B) ||| (A)/(B) | | Polymer-ization stability | CPA (%) | Plasticizer absorption time (min) | Foam-ing state |
| | DP[1] | DH[2] (mol %) | Modified group | DP[1] | DH[2] (mol %) | Modified group | | | | | | |
| 1 | 700 | 72 | unmodified | | | | 100/0 | 0.1 | excellent | 22 | 4.5 | ▲ |
| 2 | 700 | 72 | " | 520 | 38 | 0.3 mol % IA[4] | 70/30 | 0.12 | " | 25 | 4.0 | x |
| 3 | 1200 | 75 | CA group[5] | | | | 100/0 | 0.1 | " | 25 | 3.8 | ▲ |
| 4 | 700 | 72 | unmodified | 420 | 47 | SH group[3] | 70/30 | 0.12 | " | 28 | 3.5 | ▲ |
| 5 | | | | 420 | 47 | " | 0/100 | 0.1 | blocking | - | - | - |
| 6 | 800 | 72 | 0.3 mol % of IA[4] | | | | 100/0 | 0.1 | excellent | 23 | 5.0 | ▲ |
| 7 | 2000 | 80 | unmodified | | | | " | 0.1 | " | 16 | 10.6 | ▲ |

[1]DP: degree of polymerization
[2]DH: degree of hydrolysis
[3]SH group: mercapto group at one end of polymer
[4]IA: itaconic acid at side-chain
[5]CA group: carboxyl group at one end of polymer

What is claimed is:

1. A suspending agent for suspension polymerization of a vinyl compound which comprises a polyvinyl alcohol polymer (A) having a degree of hydrolysis ranging from 60 to 95 mol % and a mercapto group at an end thereof and a polyvinyl ester polymer (B) having a degree of hydrolysis of less than 60 mol %, weight ratio of component (A)/component (B) being 40/60 to 95/5.

* * * * *